United States Patent
Oliver et al.

(10) Patent No.: US 8,082,696 B2
(45) Date of Patent: Dec. 27, 2011

(54) TEMPERATURE COMPENSATING OUTDOOR WALL PADDING APPARATUS AND METHOD FOR FORMING THE SAME

(75) Inventors: Wayne P. Oliver, Delhi, NY (US); Peter L. Harvey, Salisbury, NC (US)

(73) Assignee: Sportsfield Specialties, Inc., Delhi, NY (US)

( * ) Notice: Subject to any disclaimer, the term of this patent is extended or adjusted under 35 U.S.C. 154(b) by 178 days.

(21) Appl. No.: 12/369,542

(22) Filed: Feb. 11, 2009

(65) Prior Publication Data
US 2010/0199582 A1    Aug. 12, 2010

(51) Int. Cl.
*E04H 3/10*    (2006.01)
*E04B 2/02*    (2006.01)

(52) U.S. Cl. ............ 52/6; 52/506.01; 52/511; 52/309.8; 52/573.1; 428/71; 267/142; 472/92; 472/94

(58) Field of Classification Search ........... 52/6, 506.01, 52/511, 794.1, 309.8, 309.9, 144, 145, 573.1; 428/71; 472/92, 94; 5/420; 267/142
See application file for complete search history.

(56) References Cited

U.S. PATENT DOCUMENTS

| | | | | |
|---|---|---|---|---|
| 2,606,755 A * | 8/1952 | Samuels | | 267/140 |
| 3,230,675 A * | 1/1966 | Frommelt et al. | | 52/173.2 |
| 3,500,599 A * | 3/1970 | Sciolino | | 52/173.2 |
| 3,949,432 A * | 4/1976 | Ginsburg | | 4/237 |
| 4,744,189 A * | 5/1988 | Wilson | | 52/511 |
| 5,606,841 A * | 3/1997 | Carter, Jr. | | 52/802.1 |
| 5,942,305 A * | 8/1999 | Schroeder | | 428/68 |
| 6,170,205 B1 * | 1/2001 | Styba | | 52/173.2 |
| 6,272,799 B1 * | 8/2001 | Ashelin et al. | | 52/173.2 |
| 7,727,609 B1 * | 6/2010 | Crasno | | 428/60 |
| 2004/0226228 A1 * | 11/2004 | Digmann et al. | | 52/173.2 |

FOREIGN PATENT DOCUMENTS

| | | | |
|---|---|---|---|
| CA | 2 488 747 | * | 5/2005 |
| JP | 5-171710 | * | 7/1993 |

* cited by examiner

*Primary Examiner* — Robert Canfield
(74) *Attorney, Agent, or Firm* — Heslin Rothenberg Farley & Mesiti P.C.

(57) ABSTRACT

A temperature compensating outdoor wall padding apparatus in one embodiment incorporates a stretch fabric into the edges of a vinyl cover to provide a tension on the vinyl cover minimizing the possibility of wrinkling of the vinyl cover due to a change in temperature. In another embodiment, the temperature compensating outdoor wall padding apparatus may employ a resilient cover, stretchable in 4 directions and pre-tensioned to provide tension on the resilient cover minimizing the possibility of wrinkling of the resilient cover due to a change in temperature. Methods for forming the same are also disclosed.

38 Claims, 9 Drawing Sheets

TEMPERATURE COMPENSATING OUTDOOR WALL PADDING APPARATUS AND METHOD FOR FORMING THE SAME

FIELD OF THE INVENTION

The present invention relates generally to wall padding for outdoor stadiums, and more particularly to temperature compensating outdoor wall padding.

BACKGROUND OF THE INVENTION

Outdoor stadium wall padding has been a fixture since the 1970's, protecting athletes at all levels from dangerous impacts with solid wood and/or concrete walls. The padding is typically constructed of 3 materials, a ¾-inch plywood backer board, a 3-inch polyurethane foam padding adhered to the board, and a laminated or coated UV resistant vinyl cover. This construction provides an appropriate level of safety and durability while addressing the aesthetics required by both college and professional teams. In today's era of nationally televised day and night games, it is important that the aesthetics are maintained regardless of weather/temperature or time of day.

During the cool spring and fall evenings found in the Northeast and Midwest and other geographic areas, temperatures can drop downwards 30 degrees Fahrenheit to 40 degrees Fahrenheit in a few hours. This significant variation in temperature forces the padding to contract, with the padding reacting quicker than the vinyl covering, creating a wrinkling or sagging effect in the vinyl. This wrinkling condition is temporary at best, with recovery occurring during the next warming cycle.

There is a need for further wall padding for outdoor stadiums, and more particularly to temperature compensating outdoor wall padding.

SUMMARY OF THE INVENTION

In a first aspect, the present invention provides a temperature compensating outdoor wall padding apparatus operable to inhibit the likelihood of the appearance of wrinkles due to a change in temperature. The apparatus includes a generally rigid backing having a front side and a rear side, and a padded member having a front side, a rear side, and a peripherally-extending edge defining a horizontal top edge, a horizontal bottom edge, a vertical right side edge, and a vertical left side edge. The rear side of the padded member is disposed over the front side of the generally rigid backing. A vinyl cover having a central portion is disposed over the front side of the padded member and a peripherally-extending portion defines a horizontal top portion, a horizontal bottom portion, a vertical right side portion, and a vertical left side portion which are disposed over front edge portions of the padded member along the peripherally-extending horizontal top edge, the horizontal bottom edge, the vertical right side edge, and the vertical left side edge, respectively, of the padded member. The padded member comprises a first coefficient of thermal expansion and the cover comprises a second coefficent of thermal expansion different from the first coefficient of thermal expansion. A expansion/contraction panel is disposed over the peripherally-extending edge of the padded member and has a rear portion attached to the generally rigid backing, and a front portion having a front edge sewn to the horizontal top portion, the horizontal bottom portion, the vertical right side portion, and the vertical left side portion of the cover. The expansion/contraction panel is pre-tensioned upon attachment to the rear side of the generally rigid backing to hold the cover tautly across the front side of the padded member and inhibit the likelihood of wrinkles appearing on the cover as the cover and the padded member expand and contract over a change in temperature between about 30-degrees Fahrenheit to about 40-degrees Fahrenheit in a few hours.

In a second aspect, the present invention provides a temperature compensating outdoor wall padding apparatus operable to inhibit the likelihood of the appearance of wrinkles due to a change in temperature. The apparatus includes a generally rigid backing having a front side and a rear side, and a padded member having a front side, a rear side, and a peripherally-extending edge. The rear side of the padded member is disposed over the front side of the generally rigid backing. A cover having a central portion is disposed over the front side of the padded member and a peripherally-extending portion is disposed over a front edge portion of the peripherally-extending edge of the padded member. The padded member comprises a first coefficient of thermal expansion and the cover comprises a second coefficient of thermal expansion different from the first coefficient of thermal expansion. An elastic member is disposed over the peripherally-extending edge of the padded member and is attached to the generally rigid backing and to the peripherally-extending edge of the cover. The elastic member is pre-tensioned to hold the cover tautly over the front side of the padded member and inhibit the likelihood of wrinkles appearing on the cover as the cover and the padded member expand and contract due to the change in temperature.

In a third aspect, the present invention provides a temperature compensating outdoor wall padding apparatus operable to inhibit the likelihood of the appearance of wrinkles due to a change in temperature. The apparatus includes a generally rigid backing having a front side and a rear side, and a padded member having a front side, a rear side, and a peripherally-extending edge. The rear side of the padded member is disposed over the front side of the generally rigid backing. A vinyl cover having a central portion is disposed over the front side of the padded member and a peripherally-extending portion defines a horizontal top portion, a horizontal bottom portion, a vertical right side portion, and a vertical left side portion disposed over front edge portions of the padded member along the peripherally-extending horizontal top edge, the horizontal bottom edge, the vertical right side edge, and the vertical left side edge, respectively, of the padded member. The padded member comprises a first coefficient of thermal expansion and the cover comprises a second coefficent of thermal expansion different from the first coefficient of thermal expansion. Means is provided for holding the cover tautly across the front side of the padded member to inhibit the likelihood of wrinkles appearing on the cover as the cover and the padded member expand and contract over a change in temperature between about 30-degrees Fahrenheit to about 40-degrees Fahrenheit in a few hours.

In a fourth aspect, the present invention provides a temperature compensating outdoor wall padding apparatus operable to inhibit the likelihood of the appearance of wrinkles due to a change in temperature. The apparatus includes a generally rigid backing having a front side and a rear side, and a padded member having a front side, a rear side, and a peripherally-extending edge. The rear side of the padded member is disposed over the front side of the generally rigid backing. A cover having a central portion is disposed over the front side of the padded member and a peripherally-extending portion is disposed over a front edge portion of the peripherally-extending edge of the padded member. The padded member comprises a first coefficient of thermal expansion and the cover comprises a second coefficient of thermal expansion different from the first coefficient of thermal expansion. Means is provided for holding the cover tautly across the front side of the padded member to inhibit the likelihood of wrinkles appearing on the cover as the cover and the padded member expand and contract due to the change in temperature.

In a fifth aspect, the present invention provides a temperature compensating outdoor wall padding apparatus operable to inhibit the likelihood of the appearance of wrinkles due to a change in temperature. The apparatus includes a generally rigid backing having a front side and a rear side, and a padded member having a front side, a rear side, and a peripherally-extending edge defining a horizontal top edge, a horizontal bottom edge, a vertical right side edge, and a vertical left side edge. The rear side of the padded member is disposed over the front side of the generally rigid backing. A resilient cover is stretchable vertically and horizontally, and includes a central portion and a peripherally-extending portion. The central portion is disposed over the front side of the padded member, and the peripherally-extending portion defining a horizontal top portion, a horizontal bottom portion, a vertical right side portion, and a vertical left side portion are disposed over the padded member along the peripherally-extending horizontal top edge, the horizontal bottom edge, the vertical right side edge, and the vertical left side edge, respectively. The peripherally-extending portion defines a top edge portion, a bottom edge portion, a vertical right side edge portion, and a vertical left side edge portion which are attached to the rear side of the generally rigid backing. The resilient cover is pre-tensioned upon attachment to the rear side of the generally rigid backing to hold the cover tautly across the front side of the padded member and inhibit the likelihood of wrinkles appearing on the cover as the cover and the padded member expand and contract over a change in temperature between about 30-degrees Fahrenheit to about 40-degrees Fahrenheit in a few hours.

In a sixth aspect, the present invention provides a temperature compensating outdoor wall padding apparatus operable to inhibit the likelihood of the appearance of wrinkles due to a change in temperature. The apparatus includes a generally rigid backing having a front side and a rear side, and a padded member having a front side, a rear side, and a peripherally-extending edge. The rear side of the padded member is disposed over the front side of the generally rigid backing. A resilient cover is stretchable vertically and horizontally, and includes a central portion and a peripherally-extending portion. The central portion is disposed over the front side of the padded member, and the peripherally-extending portion disposed over the peripherally-extending edge of the padded member and attached to the rear side of the generally rigid backing. The resilient cover is pre-tensioned upon attachment to the rear side of the generally rigid backing to hold the cover tautly across the front side of the padded member and inhibit the likelihood of wrinkles appearing on the cover as the cover and the padded member expand and contract due to the change in temperature.

In a seventh aspect, the present invention provides an outdoor wall panel system which includes a plurality of temperature compensating outdoor wall padding apparatus as described above and which are disposed side-by-side along a field of an outdoor stadium.

In an eight aspect, the present invention provides a method for protecting athletes in an outdoor stadium. The method includes obtaining a plurality of temperature compensating outdoor wall padding apparatus as described above, and installing the plurality of temperature compensating outdoor wall padding apparatus side-by-side along a field of the outdoor stadium.

In a ninth aspect, the present invention provides a method for forming an outdoor wall padding apparatus which inhibits the likelihood of the appearance of wrinkles due to a change in temperature. The method includes providing a generally rigid backing, providing a padded member disposed over the backing, and providing a vinyl cover. The padded member comprises a first coefficient of thermal expansion and the cover comprises a second coefficient of thermal expansion different from the first coefficient of thermal expansion. An expansion/contraction panel is provided and a front portion of the expansion/contraction panel is sewn to a peripherally-extending portion of the cover. A central portion of the cover is positioned over a front side of the padded member and the peripherally-extending portion of the cover is positioned over a front edge portion of a peripherally-extending edge of the padded member. The expansion/contraction panel is pre-tensioned and a rear portion of the pre-tensioned expansion/contraction panel is attached to the generally rigid backing to hold the cover tautly across the front side of the padded member and inhibit the likelihood of wrinkles appearing on the cover as the cover and the padded member expand and contract over a change in temperature between about 30-degrees Fahrenheit to about 40-degrees Fahrenheit in a few hours.

In a tenth aspect, the present invention provides a method for forming an outdoor wall padding apparatus which inhibits the likelihood of the appearance of wrinkles due to a change in temperature. The method includes providing a generally rigid backing, providing a padded member disposed over the backing, and providing a cover. The padded member comprises a first coefficient of thermal expansion and the cover comprises a second coefficent of thermal expansion different from the first coefficient of thermal expansion. At least one elastic member is provided and a front portion of the at least one elastic member is attached to a peripherally-extending portion of the cover. A central portion of the cover is positioned over a front side of the padded member and the peripherally-extending portion is positioned over a front edge portion of a peripherally-extending edge of the padded member. The at least one elastic member is pre-tensioned and a rear portion of the pre-tensioned at least one elastic member is attached to the generally rigid backing to hold the cover tautly across the front side of the padded member and inhibit the likelihood of wrinkles appearing on the cover as the cover and the padded member expand and contract due to the change in temperature.

In an eleventh aspect, the present invention provides a method for forming an outdoor wall padding apparatus which inhibits the likelihood of the appearance of wrinkles due to a change in temperature. The method includes providing a generally rigid backing, providing a padded member disposed over the backing, providing a resilient cover stretchable vertically and horizontally, positioning a central portion of the resilient cover over a front side of the padded member and positioning the peripherally-extending portion of the resilient cover over a front edge portion of a peripherally-extending edge of the padded member, pre-tensioning the resilient cover, and attaching a rear portion of the pre-tensioned resilient cover to the generally rigid backing to hold the resilient cover tautly across the front side of the padded member and inhibit the likelihood of wrinkles appearing on the resilient cover as the resilient cover and the padded member expand and contract over a change in temperature between about 30-degrees Fahrenheit to about 40-degrees Fahrenheit in a few hours.

BRIEF DESCRIPTION OF THE DRAWINGS

The subject matter which is regarded as the invention is particularly pointed out and distinctly claimed in the concluding portion of the specification. The invention however, may best be understood by reference to the following detailed description of various embodiments and the accompanying drawings in which:

DETAILED DESCRIPTION OF THE INVENTION

Figure 1:
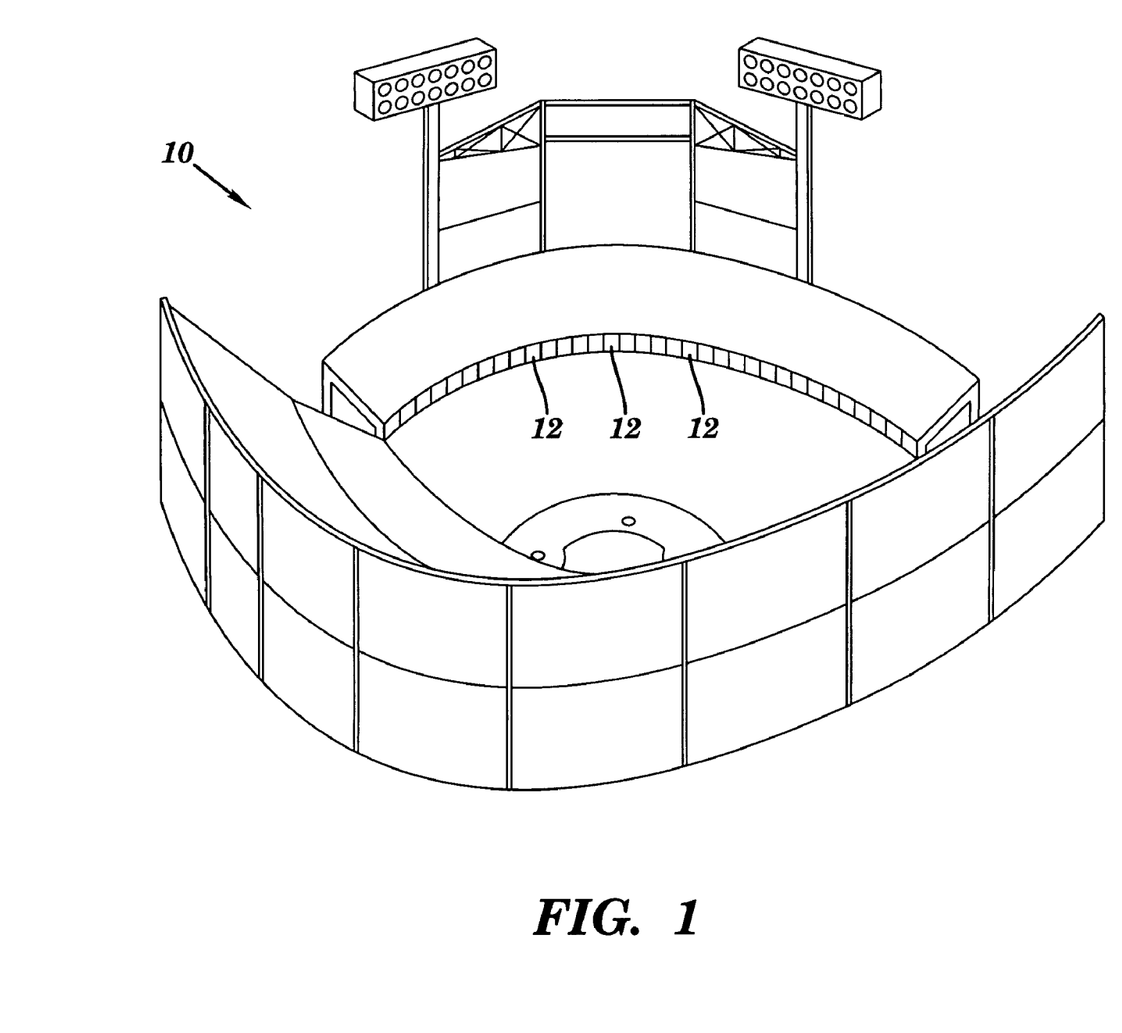
FIG. 1 is a perspective view of an outdoor stadium having a plurality of temperature compensating outdoor wall padding apparatus in accordance with the present invention.
Figure 2:
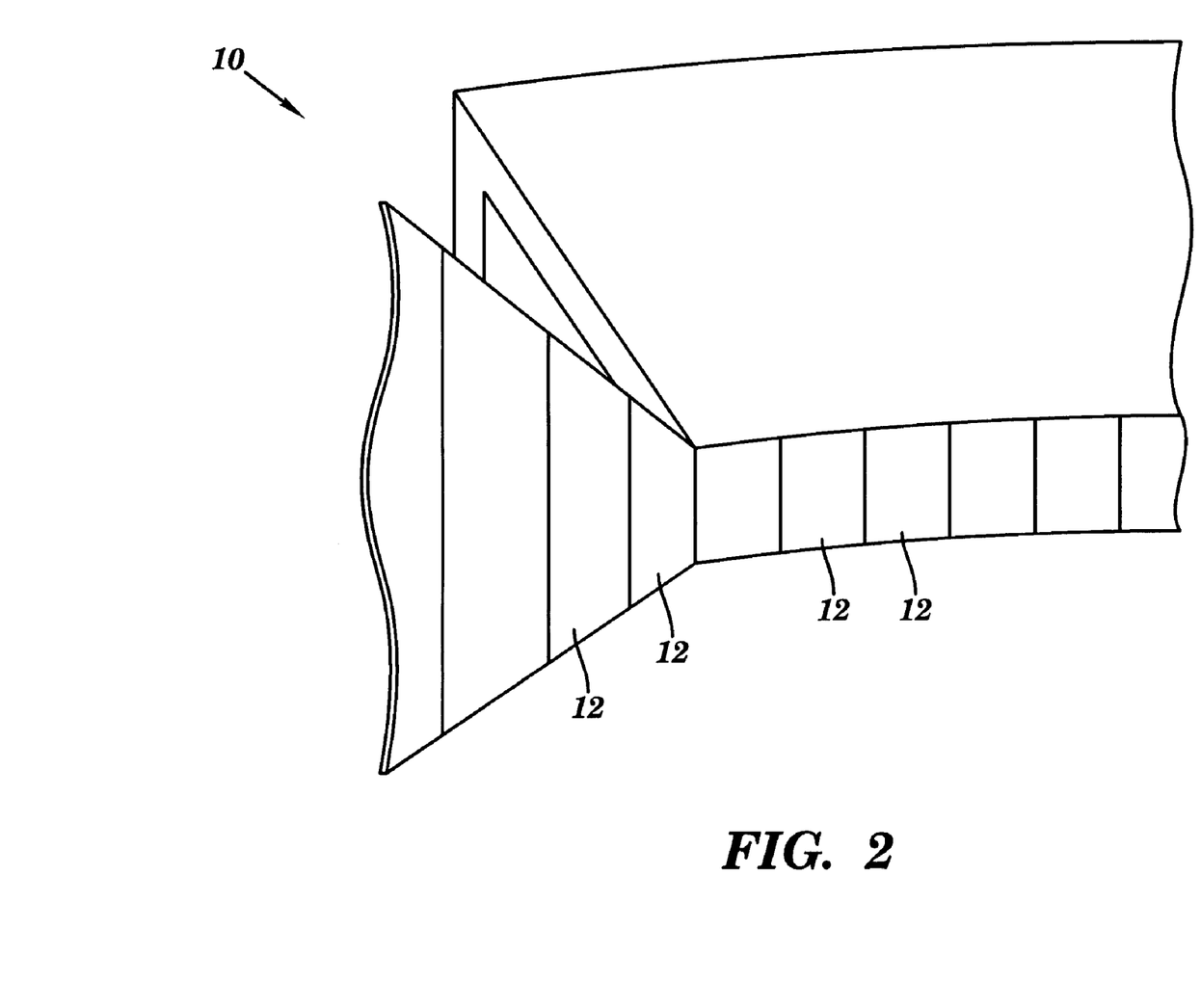
FIG. 2 is an enlarged perspective view of some of the plurality of temperature compensating outdoor wall padding apparatus of FIG. 1.

FIGS. 1 and 2 illustrate one embodiment of an outdoor stadium 10 having a plurality of temperature compensating outdoor wall padding apparatus 12 in accordance with the present invention disposed side-by-side along the field of the stadium.

As described in greater detail below, the present invention is directed to temperature compensating outdoor wall padding apparatus, which in one embodiment, incorporates a stretch fabric into the edges of a vinyl cover to provide tension, e.g., generally constant tension, on the vinyl cover, minimizing the possibility of wrinkling of the vinyl cover due to a change in temperature. For example, the present invention overcomes the problems associated with conventional outdoor wall padding which is subjected to varying temperatures, sometimes as much as about 40-degrees Fahrenheit to about 50-degrees Fahrenheit in a few hours, which causes the components of conventional system (e.g., the vinyl cover and the padding material) to expand or contract at different rates (e.g., during cooling, the padding tends to contract more quickly than the vinyl cover) resulting in unsightly wrinkling in the front surface of the vinyl cover.

Figure 3:
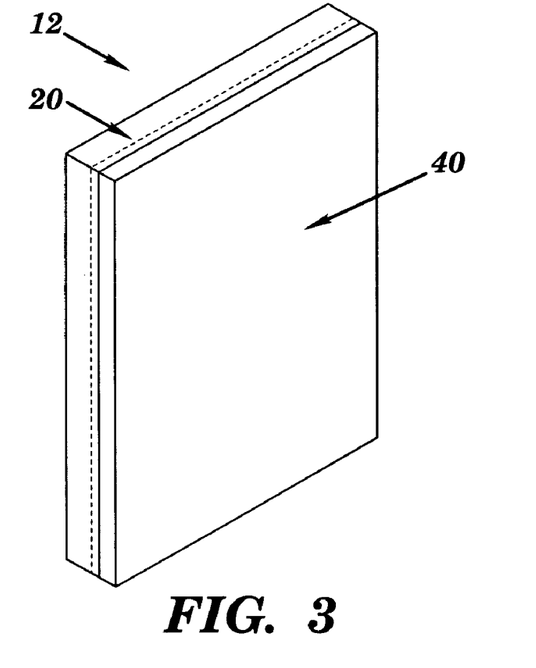
FIG. 3 is an enlarged perspective view of one of the plurality of temperature compensating outdoor wall padding apparatus of FIG. 1.

As shown in FIG. 3, temperature compensating outdoor wall padding apparatus 12 generally includes an elastic member such as an expansion/contraction panel 20 sewn to a vinyl cover 40 so that the expansion/contraction panel approximates the thickness of the apparatus, i.e. extends along the peripherally-extending edges of the apparatus where the vertical sides will be covered by an adjacent temperature compensating outdoor wall padding apparatus and not been seen from the field, from the stands of the stadium, or observed when broadcast to a television. As described below, the expansion/contraction panel is integrated into the vinyl cover in a pre-tensioned manner to ensure that when the temperature drops the vinyl cover is drawn tight to the face of the apparatus. Conversely, when the temperature increases the expansion/contraction panel allows the vinyl cover to expand with the growth of the apparatus. The present invention eliminates the wrinkling and sagging problem without impacting the primary functioning of the wall padding.

Figure 4:
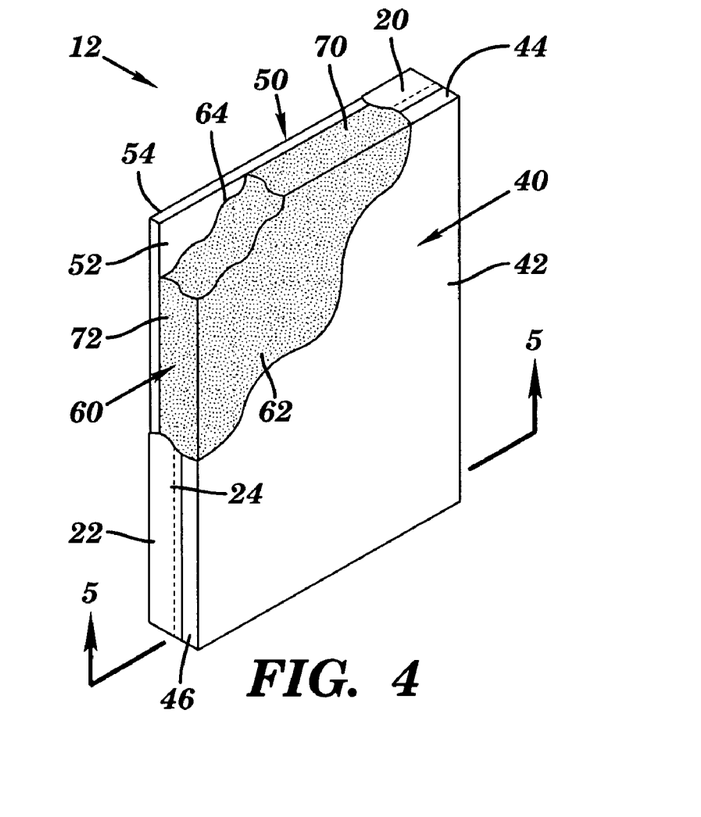
FIG. 4 is a perspective view, partially cut-away, of the temperature compensating outdoor wall padding apparatus of FIG. 3.

As best shown in FIG. 4, apparatus 12 may generally include a generally rigid backing 50, a padded member 60, cover 40, and expansion/contraction panel 20. The apparatus maybe about 4-inches thick, about 4-feet wide, and between about 2-feet and about 10 feet high. It will be appreciated that other sizes may be suitably configured.

Generally rigid backing 50 includes a front side 52 and a rear side 54. The backing may be fabricated from plywood, a thermoplastic material, a biocomposite material, or other suitable generally rigid board material. The generally rigid backing may be about ¾-inch thick. It will be appreciated that other generally rigid backing materials may be suitably configured such as a wood, plastic, or metal frame or other structure, which is attachable to the padded member.

Padded member 60 may be formed from polyurethane such as expanded polypropylene (EPP), expanded polyethylene (EPE), fused beaded EPE foam, or other foam or resilient material for providing protection to an athlete upon contact with the wall padding. Padded member 60 includes a front side 62, a rear side 64, and a peripherally-extending edge. The peripherally-extending edge may include a horizontal top edge 70, a horizontal bottom edge (not shown in FIG. 4), a vertical left side edge 72, and a vertical right side edge (not shown in FIG. 4). The rear side of the padded member may be disposed over the front side of the generally rigid backing. For example, a water-based adhesive may be used to attach the padded member to the generally rigid backing. The padded member may be about 3-inches in thickness and correspond to the width and height of the generally rigid backing.

Cover 40 may be a vinyl cover such as a high ultraviolet (UV) 16-ounce or 25-ounce laminated or coated vinyl. Cover 40 includes a central portion 42 extending over the front side of the padded member and a peripherally-extending portion defining a horizontal top portion 44, a horizontal bottom portion (not shown in FIG. 4), a vertical left side portion 46, and a vertical right side portion (not shown in FIG. 4) disposed over front edge portions of the padded member along the peripherally-extending horizontal top edge 70, the horizontal bottom edge, the vertical left side edge 72, and the vertical right side edge, respectively, of the padded member.

Due to the materials forming the padded member and the cover, the padded member likely comprises a first coefficient of thermal expansion (e.g., linear thermal expansion, area thermal expansion, and/or volumetric thermal expansion) and the cover likely comprises a second coefficent of thermal expansion (linear thermal expansion, area thermal expansion, and/or volumetric thermal expansion) which is different from the first coefficient of thermal expansion. Thus, a change in temperature may cause a wrinkling in the cover.

To reduce the likelihood of the cover wrinkling due to a change in temperature, expansion/contraction panel 20 extends around the peripherally-extending edge of the padded member and has a rear portion 22 attached to the generally rigid backing, and a front portion 24 having a front edge sewn to the horizontal top portion 46, the horizontal bottom portion (not shown in FIG. 4), the vertical left side portion 44, and the vertical right side portion (not shown in FIG. 4) of the cover. A single or double stitch may be employed to attach the front edge of the expansion/contraction panel 20 to the cover.

Figure 5:
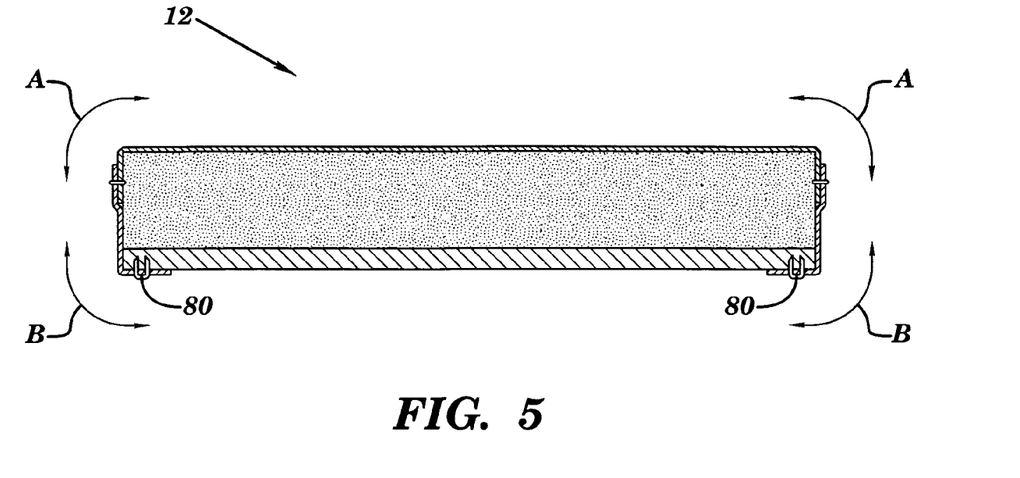
FIG. 5 is an enlarged, cross-sectional view of the temperature compensating outdoor wall padding apparatus taken along line 5-5 in FIG. 4.

When securing expansion/contraction panel 20 to backing 50, the expansion/contraction panel is pre-tensioned to hold the cover tautly across the front side of the padded member. The pre-tensioning inhibits the likelihood of wrinkles appearing on the cover as the cover and the padded member expand and contract over a change of temperatures between about 30-degrees Fahrenheit to about 40-degrees Fahrenheit in a few hours, and desirably between about 40-degrees Fahrenheit and 50-degrees Fahrenheit in a few hours. For example, with reference to FIG. 5, the rear portion of the expansion/contraction panel may be attached to the backing with galvanized or stainless steel staples 80, nails, or other suitable attachment means. Thus, the cover is in tension from the left side to the right side as illustrated by the two double arrows A in FIG. 5. The expansion/contraction panel is also in tension between the left and right sides as illustrated by the double arrows B. In addition, the cover is in tension between the top and the bottom sides of the cover (not illustrated in FIG. 5), and the expansion/contraction panel is also in tension along the top and bottom sides (not illustrated in FIG. 5). The expansion/contraction panel may be an elongated single strip of material having a length which corresponds to the periphery of the wall panel. In another embodiment, the expansion/contraction panel may be a plurality of separate strips which correspond to the sides of the wall panel.

The expansion/contraction panel may be fabricated from a material which is stretchable (e.g., greater than 50-percent, and desirably greater than 100-percent) primarily in 2 directions, or stretchable (e.g., greater than 50-percent, and desirably greater than 100-percent) in 4 directions and/or 360 degrees. Desirably, the material is able to retain its shape and return back to its original structure after being stretched. The material may also include a high UV protection as well as TEFLON coating for water resistance.

For example, the expansion/contraction panel may be fabricated from a nylon stretch fabric which is stretchable (e.g., greater than 100-percent) primarily in 2 directions, such as a nylon or nylon composite material. Such material may include a SPANDURA fabric, a stretchable LYCRA material combined the durability of CORDURA nylon material. In addition, the expansion/contraction panel may be fabricated from a material that is stretchable (e.g., greater than 100-percent) in 4 directions. One suitable material is sold under the trademark ALLSPORT 4-Way Stretch Vinyl manufactured and available from Morbern, Inc. of Cornwall, Ontario, Canada. For example, the ALLSPORT material has a nominal total thickness of 0.040±0.005 inches (45±5 mils), a standard weight of 32.25±1.5 ounces per linear yard, and greater than 100-percent stretch in both directions. LYCRA and SPANDURA, and combinations with other materials, may also be configured to stretch in 4 directions.

It will be appreciated by those skilled in the art that any other suitable materials having 2-way and 4-way expansion/contraction capabilities may be employed. From the present description, it will be appreciated by those skilled in the art that other suitable means may also be employed for holding the cover tautly across the front side of the padded member to inhibit the likelihood of wrinkles appearing on the cover as the cover and the padded member expand and contract over a change in temperature. For example, such holding means may include tensioning means or elastic members, for example, non-woven elastic materials, or suitable elastic elements which may be pre-tensioned.

While the temperature compensating outdoor wall padding apparatus incorporates an expansion/contraction panel on all sides of the apparatus and around the entire peripheral edge of the apparatus, it will be appreciated that the expansion/contraction panel may need not be disposed on all the sides of the apparatus, and may for example, be only disposed on two of the sides, or only partially around the entire periphery of the padded member.

Figure 6:
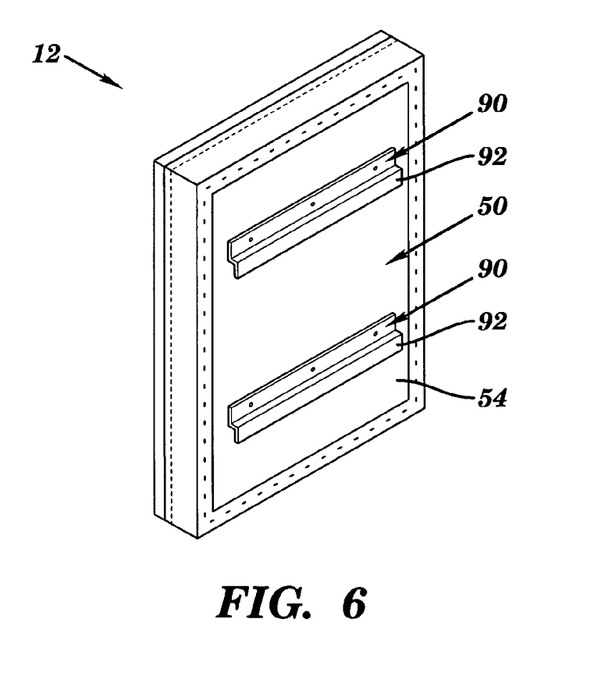
FIG. 6 a perspective rear view of the temperature compensating outdoor wall padding apparatus of FIG. 3.

In this illustrated embodiment, as best shown in FIG. 6, Z-shaped clips 90 may be attached to and extend horizontally across rear side 54 of backing 50. The Z-shaped clips may be attached to the backing with T-nuts and suitable hardware. The Z-shaped clips include a lower downwardly-depending portion 92 which is spaced from or offset from the backing. The Z-shaped clips allow for a fast and easy method for hanging of the apparatus. For example, corresponding horizontally disposed Z-shaped clips having an upwardly-extending portion may be attached to a fence or wall of a stadium with the upwardly-extending portion being spaced from or offset from the fence or wall. Thus, the corresponding Z-shaped clips wedge together to lock the wall padding apparatus in place. To disengage the wall padding apparatus, one simply lifts the wall padding apparatus upward and away from the fence or wall. The Z-clips may be made of aluminum, a plastic material, other metal material, or from other suitable materials. It will be appreciated by those skilled in the art that other suitable means may be employed for attaching the apparatus to a fence or wall.

Figure 7:
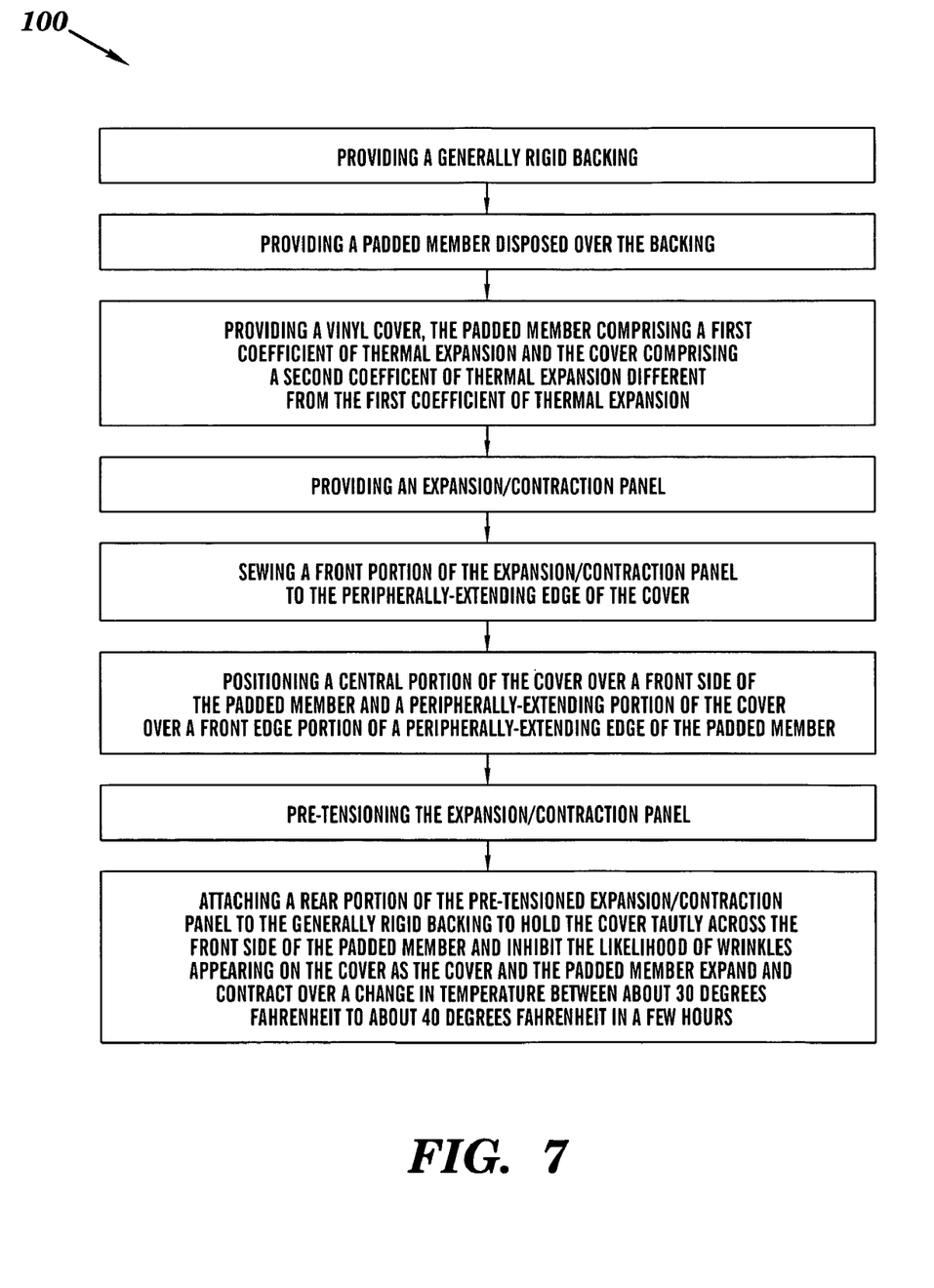
FIG. 7 is a flowchart of one embodiment of a method in accordance with the present invention for forming an outdoor wall padding apparatus which inhibits the likelihood of the appearance of wrinkles appearing on the outdoor wall padding apparatus due to a change in temperature.
Figure 8:
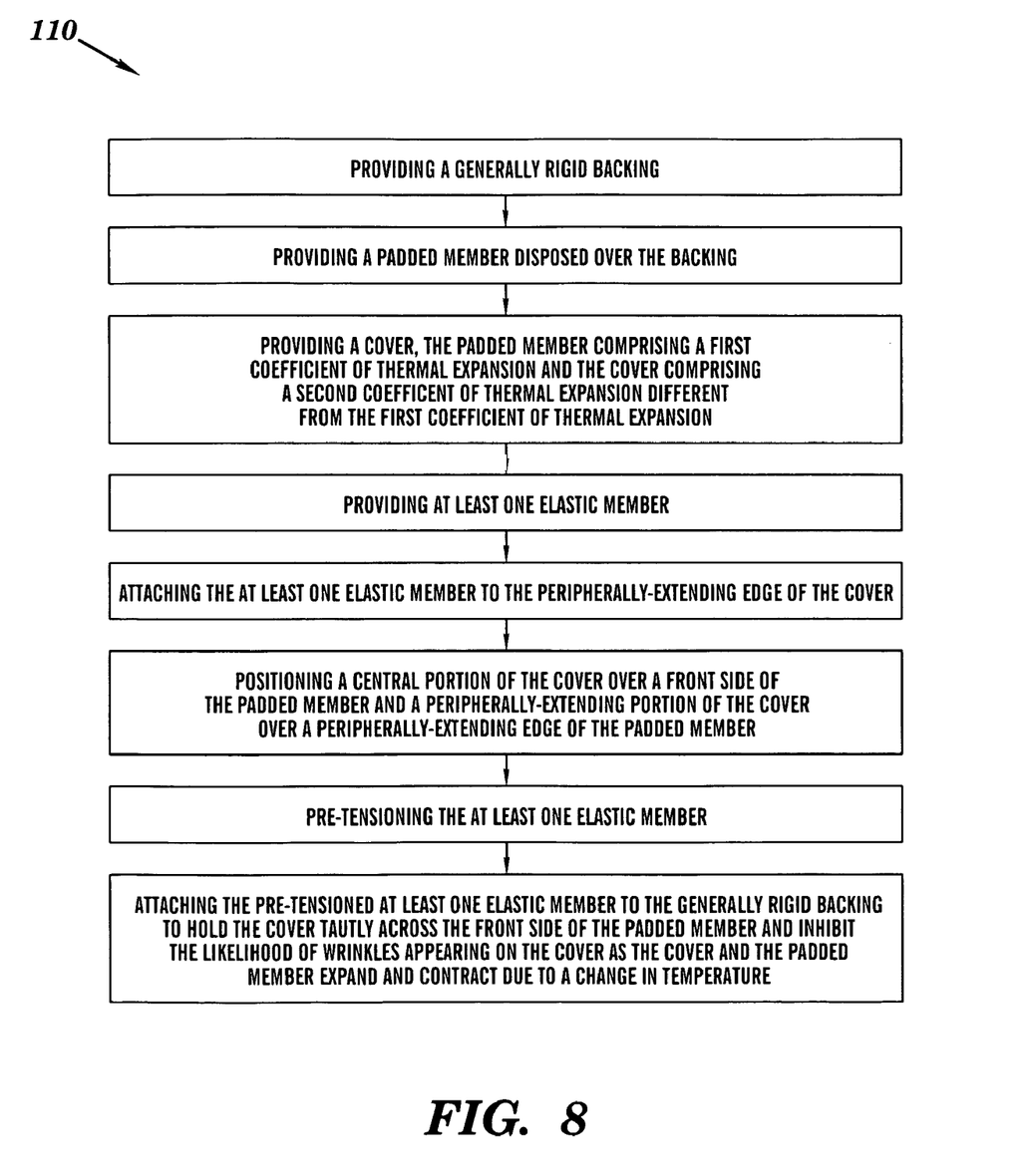
FIG. 8 is a flowchart of another embodiment of a method in accordance with the present invention for forming outdoor wall padding apparatus which inhibits the likelihood of the appearance of wrinkles appearing on the outdoor wall padding apparatus due to a change in temperature.

FIGS. 7 and 8 illustrate flowcharts describing two methods 100 and 110 in accordance with the present invention for forming an outdoor wall padding which inhibits the likelihood of the appearance of wrinkles appearing on the outdoor wall padding.

The present invention, in another aspect, is directed to temperature compensating outdoor wall padding apparatus that incorporates a resilient cover such as a stretch fabric which is pre-tensioned to provide a tension, e.g., a generally constant tension, on the cover to minimize the possibility of wrinkling of the cover due to a change in temperature. For example, this embodiment of the present invention overcomes the problems associated with conventional outdoor wall padding which is subjected to varying temperatures, sometimes as much as about 40-degrees Fahrenheit to about 50-degrees Fahrenheit in a few hours that cause the components of conventional system (e.g., the vinyl cover and padding material) to expand or contract at different rates (e.g., during cooling, the padding tends to contract more quickly than the vinyl cover) resulting in unsightly wrinkling in the front surface of the vinyl cover.

Figure 9:
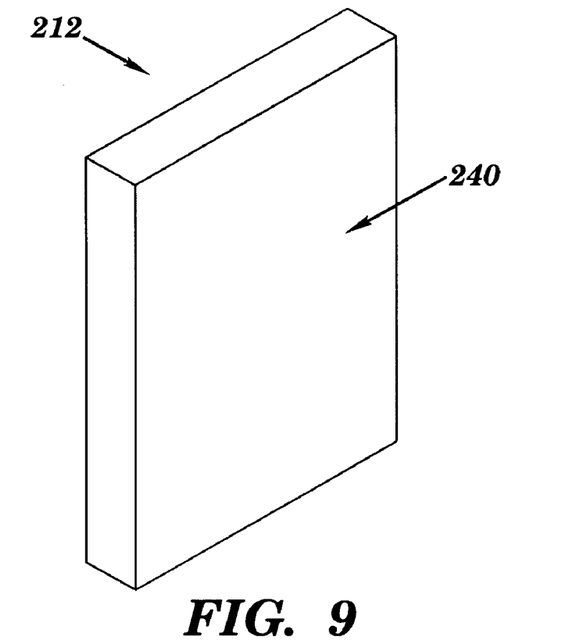
FIG. 9 is a perspective view of another embodiment of a temperature compensating outdoor wall padding apparatus in accordance with the present invention.

FIG. 9 illustrates another embodiment of a temperature compensating outdoor wall padding apparatus 212 in accordance with the present invention which generally includes a resilient cover 240 which covers and extends around the thickness of the apparatus, i.e. extends along the peripherally-extending edges of the apparatus. The vertical sides of the apparatus are typically disposed adjacent to another temperature compensating outdoor wall padding apparatus when installed, for example, in a stadium. As described below, the resilient cover is integrated into the apparatus in a pre-tensioned manner to ensure that when the temperature drops the resilient cover is drawn tight to the face of the apparatus. Conversely, when the temperature increases the resilient cover allows the resilient cover to expand with the growth of the apparatus. The present invention eliminates the wrinkling and sagging problem without impacting the primary functioning of the wall padding.

Figure 10:
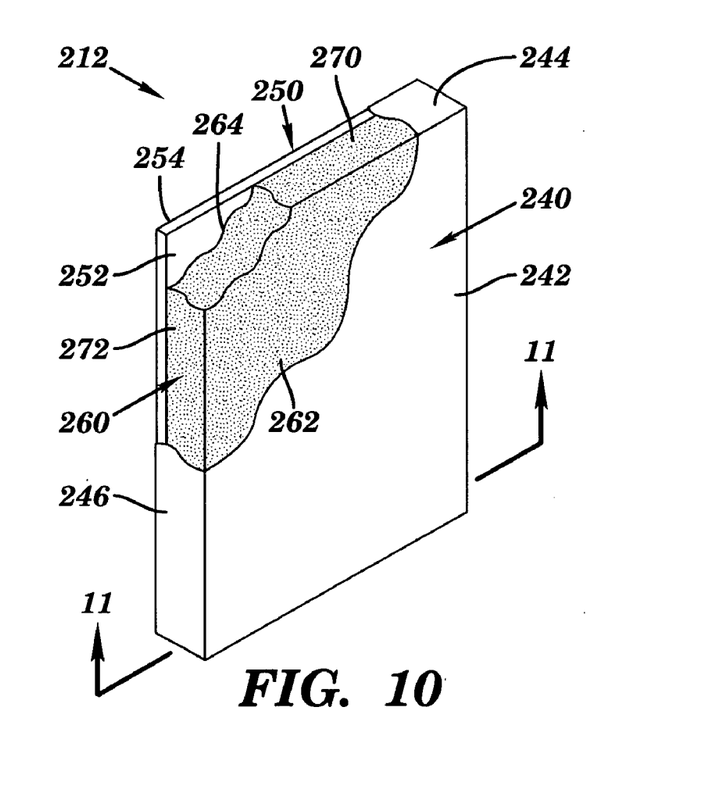
FIG. 10 is a perspective view, partially cut-away, of the temperature compensating outdoor wall padding apparatus of FIG. 9.

As best shown in FIG. 10, apparatus 212 may generally include a generally rigid backing 250, a padded member 260, and resilient cover 240. The apparatus may be about 4-inches thick, about 4-feet wide, and between about 2-feet and about 10 feet high. It will be appreciated that other sizes may be suitably configured.

Generally rigid backing 250 includes a front side 252 and a rear side 254. The backing may be fabricated from plywood, a thermoplastic material, a biocomposite material, or other suitable generally rigid board material. The generally rigid backing may be about ¾-inch thick. It will be appreciated that other generally rigid backing materials may be suitably configured such as a wood, plastic, or metal frame or other structure, which is attachable to the padded member.

Padded member 260 may be formed from polyurethane such as expanded polypropylene (EPP), expanded polyethylene (EPE), fused beaded EPE foam, or other foam or resilient material for providing protection to an athlete upon contact with the wall padding. Padded member 260 includes a front side 262, a rear side 264, and a peripherally-extending edge. The peripherally-extending edge may include a horizontal top edge 270, a horizontal bottom edge (not shown in FIG. 10), a vertical left side edge 272, and a vertical right side edge (not shown in FIG. 10). The rear side of the padded member may be disposed over the front side of the generally rigid backing. For example, a water-based adhesive may be used to attach the padded member to the generally rigid backing. The padded member may be about 3-inches in thickness and correspond to the width and height of the generally rigid backing.

Resilient cover 240 includes a central portion 242 extending over the front side of the padded member and a peripherally-extending portion defining a horizontal top portion 244, a horizontal bottom portion (not shown in FIG. 10), a vertical left side portion 246, and a vertical right side portion (not shown in FIG. 10) disposed over edge portions of the padded member along the peripherally-extending horizontal top edge 270, the horizontal bottom edge, the vertical left side edge 272, and the vertical right side edge, respectively, of the padded member. The peripherally-extending portion also defines a top edge portion, a bottom edge portion, a vertical right side edge portion, and a vertical left side edge portion which are attached to the rear side of the generally rigid backing.

Due to the materials forming the padded member and the resilient cover, the padded member likely comprises a first coefficient of thermal expansion (e.g., linear thermal expansion, area thermal expansion, and/or volumetric thermal expansion) and the resilient cover likely comprises a second coefficient of thermal expansion (linear thermal expansion, area thermal expansion, and/or volumetric thermal expansion) which is different from the first coefficient of thermal expansion. Thus, a change in temperature may cause a wrinkling in the resilient cover if the resilient cover was not pre-tensioned.

To reduce the likelihood of the cover wrinkling due to a change in temperature, when securing resilient cover 240 to backing 250, the resilient cover is pre-tensioned to hold the resilient cover tautly across the front side of the padded member. The pre-tensioning inhibits the likelihood of wrinkles appearing on the cover as the cover and the padded member expand and contract over a change of temperatures between about 30-degrees Fahrenheit to about 40-degrees Fahrenheit in a few hours, and desirably between about 40-degrees Fahrenheit and 50-degrees Fahrenheit in a few hours.

Figure 11:
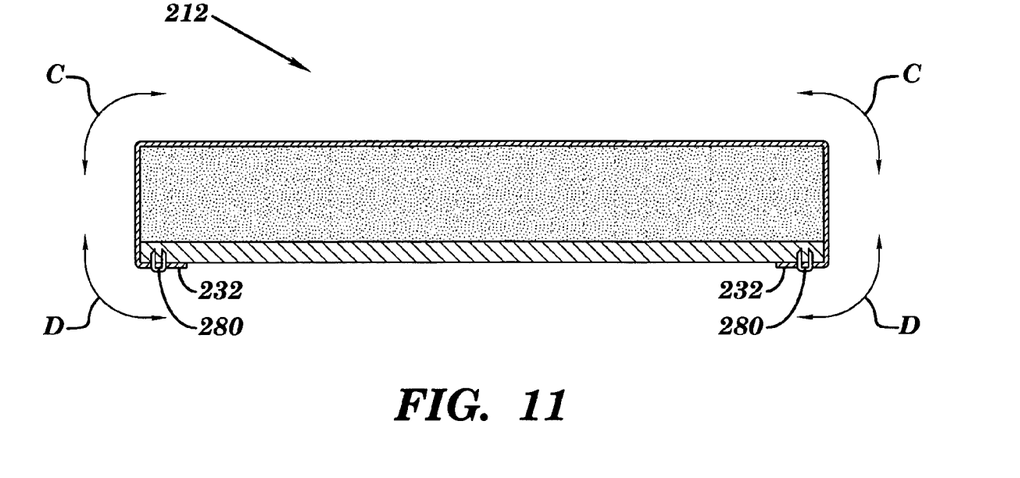
FIG. 11 is an enlarged, cross-sectional view of the temperature compensating outdoor wall padding apparatus taken along line 11-11 in FIG. 10.

For example, with reference to FIG. 11, a rear peripherally-extending edge portion 232 of the resilient cover may be attached to the backing with galvanized or stainless steel staples 280, nails, or other suitable attachment means. Thus, the cover is in tension from the left side to the right side as illustrated by the two double arrows C in FIG. 5. The resilient cover is also in tension between the left and right sides as illustrated by the double arrows D. In addition, the cover is in tension between the top and the bottom sides of the cover (not illustrated in FIG. 11).

The resilient cover may be fabricated from a material or fabric which is stretchable (e.g., having a greater than 50-percent stretch, and desirably greater than 100-percent) in 4 directions and/or in 360-degrees. Desirably the material is able to retain its shape and return back to its original structure after being stretched. The material may also include a high UV protection as well as TEFLON coating for water resistance. When pre-tensioning the resilient cover, the resilient cover may be stretched about or greater than 10-percent, 20-percent, 40-percent, or greater over its normal unstretched size.

One suitable material is sold under the trademark ALLSPORT 4-Way Stretch Vinyl manufactured and available from Morbern, Inc. of Cornwall, Ontario, Canada. For example, the ALLSPORT material has a nominal total thickness of 0.040±0.005 inches (45±5 mils), a standard weight of 32.25±1.5 ounces per linear yard, and greater than 100-percent stretch in both directions. LYCRA and SPANDURA, and combinations with other materials, may also be configured to stretch in 4 directions. It will also be appreciated by those skilled in the art that any other suitable material having 4-way expansion/contraction capabilities may be employed in forming the resilient cover.

Figure 12:
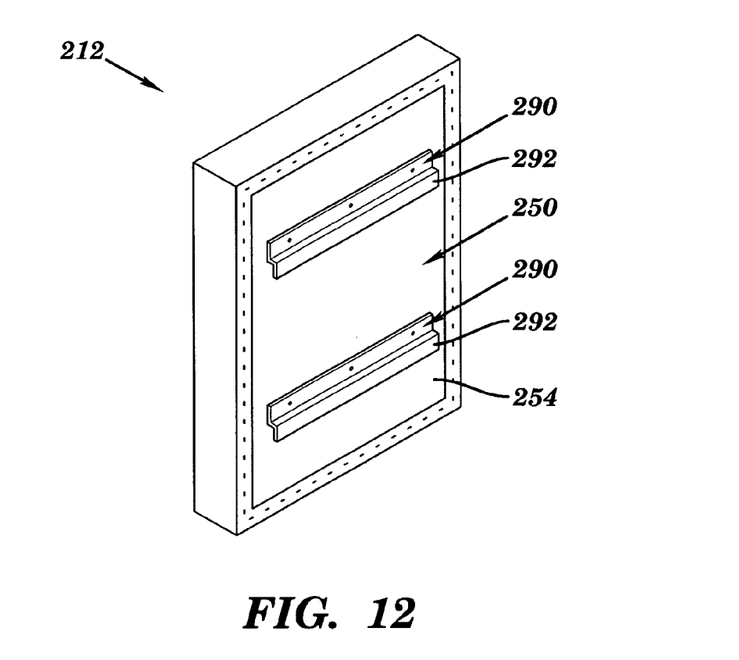
FIG. 12 a perspective rear view of the temperature compensating outdoor wall padding apparatus of FIG. 9.

In this illustrated embodiment as best shown in FIG. 12, Z-shaped clips 290 may be attached to and extend horizontally across rear side 254 of backing 250. The Z-shaped clips may be attached to the backing with T-nuts and suitable hardware. The Z-shaped clips include a lower downwardly-depending portion 292 which is spaced from or offset from the backing. The Z-shaped clips allow for a fast and easy method for hanging of the apparatus. For example, corresponding horizontally disposed Z-shaped clips having an upwardly-extending portion may be attached to a fence or wall of a stadium with the upwardly-extending portion being spaced from or offset from the fence or wall. Thus, the corresponding Z-shaped clips wedge together to lock the wall padding apparatus in place. To disengage the wall padding apparatus, one simply lifts the wall padding apparatus upward and away from the fence or wall. The Z-clips may be made of aluminum, a plastic material, other metal material, or from other suitable materials. It will be appreciated by those skilled in the art that other suitable means may be employed for attaching the apparatus to a fence or wall.

Figure 13:
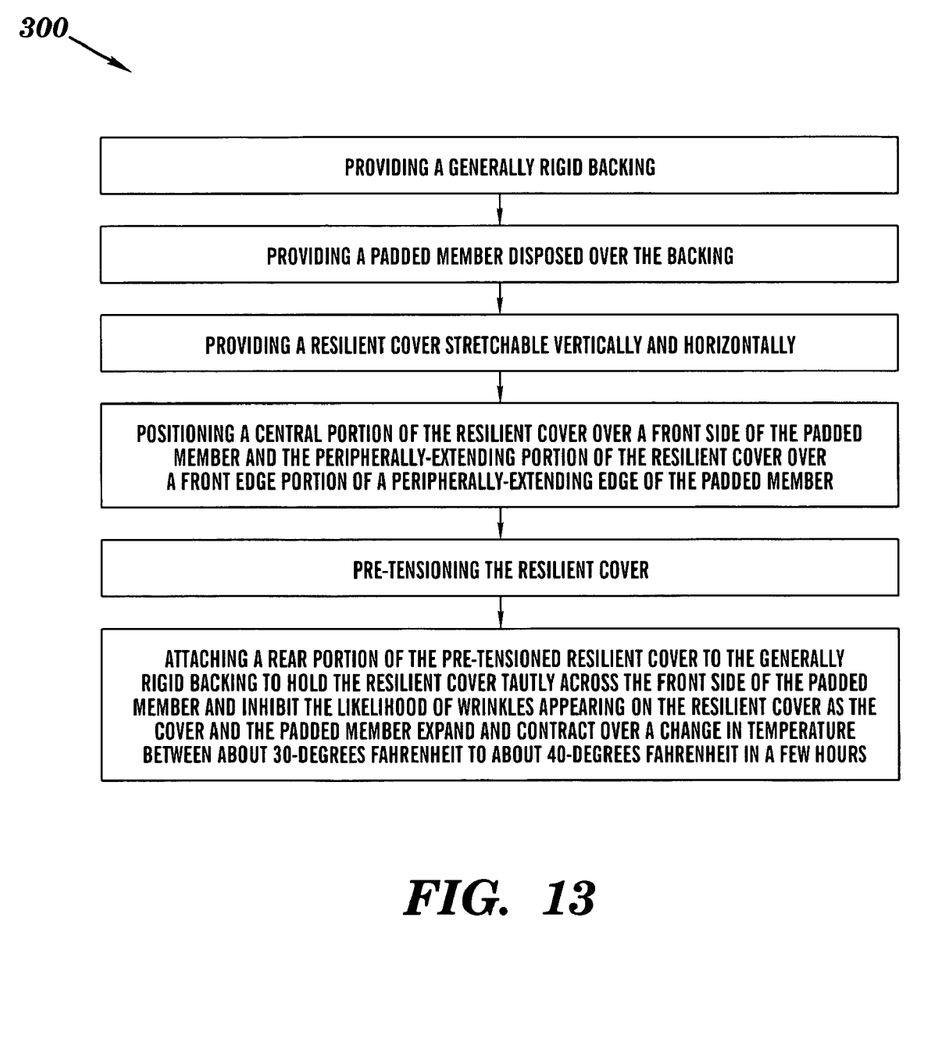
FIG. 13 is a flowchart of another embodiment of a method for forming an outdoor wall padding apparatus which inhibits the likelihood of the appearance of wrinkles appearing on the outdoor wall padding apparatus due to a change in temperature in accordance with the present invention.

FIG. 13 illustrates a flowchart describing another embodiment of a method 300 in accordance with the present invention for forming an outdoor wall padding which inhibits the likelihood of the appearance of wrinkles appearing on the outdoor wall padding.

A plurality of temperature compensating outdoor wall padding apparatus 212 shown in FIG. 9 may be suitably employed in the outdoor stadium, e.g., as shown in FIGS. 1 and 2, in accordance with the present invention disposed side-by-side along the field of the stadium.

Although the invention has been particularly shown and described with reference to certain preferred embodiments, it will be readily appreciated by those of ordinary skill in the art that various changes and modifications may be made therein, without departing from the spirit and scope of the invention.

The invention claimed is:

1. A temperature compensating outdoor wall padding apparatus operable to inhibit the likelihood of the appearance of wrinkles due to a change in temperature, said apparatus comprising:
    a generally rigid backing having a front side and a rear side;
    a padded member having a front side, a rear side, and a peripherally-extending edge defining a horizontal top edge, a horizontal bottom edge, a vertical right side edge, and a vertical left side edge, said rear side of said padded member disposed over said front side of said generally rigid backing;
    a vinyl cover having a central portion disposed over said front side of said padded member and a peripherally-extending portion defining a horizontal top portion, a horizontal bottom portion, a vertical right side portion, and a vertical left side portion disposed over front edge portions of said padded member along said peripherally-extending horizontal top edge, said horizontal bottom edge, said vertical right side edge, and said vertical left side edge, respectively, of said padded member, said padded member comprising a first coefficient of thermal expansion and said cover comprising a second coefficient of thermal expansion different from said first coefficient of thermal expansion;
    a expansion/contraction panel disposed over said peripherally-extending edge of said padded member and having a rear portion attached to said generally rigid backing, and a front portion having a front edge sewn to said horizontal top portion, said horizontal bottom portion, said vertical right side portion, and said vertical left side portion of said cover; and
    wherein said expansion/contraction panel is pre-tensioned upon attachment to said rear side of said generally rigid backing to hold said cover tautly across said front side of said padded member and inhibit the likelihood of wrinkles appearing on said cover as said cover and said padded member expand and contract over a change in temperature between about 30-degrees Fahrenheit to about 40-degrees Fahrenheit in a few hours.

2. The temperature compensating outdoor wall padding apparatus of claim 1 wherein said apparatus comprises a thickness of about 4-inches thick, a width of about 4-feet, and a height between about 2-feet and about 10 feet.

3. The temperature compensating outdoor wall padding apparatus of claim 1 wherein said expansion/contraction panel comprises a fabric material stretchable primarily in 2 directions.

4. The temperature compensating outdoor wall padding apparatus of claim 1 wherein said expansion/contraction panel comprises a fabric material stretchable in 4 directions.

5. The temperature compensating outdoor wall padding apparatus of claim 1 wherein said expansion/contraction panel comprises a greater than 50-percent stretchability and ability to return back to its original shape after being stretched.

6. The temperature compensating outdoor wall padding apparatus of claim 1 wherein said expansion/contraction panel comprises a greater than 100-percent stretchability and ability to return back to its original shape after being stretched.

7. The temperature compensating outdoor wall padding apparatus of claim 1 wherein said cover is sewn along the entire length of said peripherally-extending portion of said cover.

8. An outdoor wall panel system comprising:
    a plurality of temperature compensating outdoor wall padding apparatus of claim 1 disposed side-by-side along a field of an outdoor stadium.

9. A method of protecting athletes in an outdoor stadium, the method comprising:
    obtaining a plurality of temperature compensating outdoor wall padding apparatus of claim 1; and
    installing the plurality of temperature compensating outdoor wall padding apparatus side-by-side along a field of the outdoor stadium.

10. A temperature compensating outdoor wall padding apparatus operable to inhibit the likelihood of the appearance of wrinkles due to a change in temperature, said apparatus comprising:
    a generally rigid backing having a front side and a rear side;
    a padded member having a front side, a rear side, and a peripherally-extending edge, said rear side of said padded member disposed over said front side of said generally rigid backing;
    a cover having a central portion disposed over said front side of said padded member and a peripherally-extending portion disposed over a front edge portion of said peripherally-extending edge of said padded member, said padded member comprising a first coefficient of thermal expansion and said cover comprising a second coefficient of thermal expansion different from said first coefficient of thermal expansion;
    an elastic member disposed over said peripherally-extending edge of said padded member, said elastic member attached to said rear side of said generally rigid backing and to said peripherally-extending edge of said cover; and
    wherein said elastic member is pre-tensioned to hold said cover tautly across said front side of said padded member and inhibit the likelihood of wrinkles appearing on said cover as said cover and said padded member expand and contract due to the change in temperature.

11. The temperature compensating outdoor wall padding apparatus of claim 10 wherein said elastic member is pre-tensioned to hold said cover tautly across said front side of said padded member and inhibit the likelihood of wrinkles appearing on said cover as said cover and said padded member expand and contract at different rates over a change of temperature between about 30-degrees Fahrenheit to about 40-degrees Fahrenheit in a few hours.

12. The temperature compensating outdoor wall padding apparatus of claim 10 wherein said elastic member is pre-tensioned to hold said cover tautly across said front side of said padded member and inhibit the likelihood of wrinkles appearing on said cover as said cover and said padded member expand and contract over a change in temperature between about 40-degrees Fahrenheit to about 50-degrees Fahrenheit in a few hours.

13. The temperature compensating outdoor wall padding apparatus of claim 10 wherein said elastic member is sewn to said peripherally-extending edge of said cover.

14. The temperature compensating outdoor wall padding apparatus of claim 10 wherein said cover is sewn along the entire length of said peripherally-extending edge of said cover.

15. The temperature compensating outdoor wall padding apparatus of claim 10 wherein said cover comprises a vinyl material.

16. The temperature compensating outdoor wall padding apparatus of claim 10 wherein said elastic member comprises a fabric material stretchable primarily in 2 directions.

17. The temperature compensating outdoor wall padding apparatus of claim 10 wherein said elastic member comprises a fabric material stretchable in 4 directions.

18. The temperature compensating outdoor wall padding apparatus of claim 10 wherein said elastic member comprises a greater than 50-percent stretchability and ability to return back to its original shape after being stretched.

19. The temperature compensating outdoor wall padding apparatus of claim 10 wherein said elastic member comprises a greater than 100-percent stretchability and ability to return back to its original shape after being stretched.

20. An outdoor wall panel system comprising:
a plurality of temperature compensating outdoor wall padding apparatus of claim 10 disposed side-by-side along a field of an outdoor stadium.

21. A method of protecting athletes in an outdoor stadium, the method comprising:
obtaining a plurality of temperature compensating outdoor wall padding apparatus of claim 10; and
installing the plurality of temperature compensating outdoor wall padding apparatus side-by-side along a field of the outdoor stadium.

22. An outdoor wall panel system comprising:
a plurality of temperature compensating outdoor wall padding apparatus disposed side-by-side along a field of an outdoor stadium; and
wherein said temperature compensating outdoor wall padding apparatus is operable to inhibit the likelihood of the appearance of wrinkles due to a change in temperature, and wherein said temperature compensating outdoor wall padding apparatus comprises:
a generally rigid backing having a front side and a rear side;
a padded member having a front side, a rear side, and a peripherally-extending edge, said rear side of said padded member disposed over said front side of said generally rigid backing;
a vinyl cover having a central portion disposed over said front side of said padded member and a peripherally-extending portion defining a horizontal top portion, a horizontal bottom portion, a vertical right side portion, and a vertical left side portion disposed over front edge portions of said padded member along said peripherally-extending horizontal top edge, said horizontal bottom edge, said vertical right side edge, and said vertical left side edge, respectively, of said padded member, said padded member comprising a first coefficient of thermal expansion and said cover comprising a second coefficient of thermal expansion different from said first coefficient of thermal expansion; and
elastic means for holding said cover tautly over said front side of said padded member to inhibit the likelihood of wrinkles appearing on said cover as said cover and said padded member expand and contract over a change in temperature between about 30-degrees Fahrenheit to about 40-degrees Fahrenheit in a few hours.

23. A method of protecting athletes in an outdoor stadium, the method comprising:
obtaining a plurality of temperature compensating outdoor wall padding apparatus, said temperature compensating outdoor wall padding apparatus being operable to inhibit the likelihood of the appearance of wrinkles due to a change in temperature, and said temperature compensating outdoor wall padding apparatus comprising:
a generally rigid backing having a front side and a rear side;
a padded member having a front side, a rear side, and a peripherally-extending edge, said rear side of said padded member disposed over said front side of said generally rigid backing;
a vinyl cover having a central portion disposed over said front side of said padded member and a peripherally-extending portion defining a horizontal top portion, a horizontal bottom portion, a vertical right side portion, and a vertical left side portion disposed over front edge portions of said padded member along said peripherally-extending horizontal top edge, said horizontal bottom edge, said vertical right side edge, and said vertical left side edge, respectively, of said padded member, said padded member comprising a first coefficient of thermal expansion and said cover comprising a second coefficient of thermal expansion different from said first coefficient of thermal expansion; and
elastic means for holding said cover tautly over said front side of said padded member to inhibit the likelihood of wrinkles appearing on said cover as said cover and said padded member expand and contract over a change in temperature between about 30-degrees Fahrenheit to about 40-degrees Fahrenheit in a few hours; and
installing the plurality of temperature compensating outdoor wall padding apparatus side-by-side along a field of the outdoor stadium.

24. A temperature compensating outdoor wall padding apparatus operable to inhibit the likelihood of the appearance of wrinkles due to a change in temperature, said apparatus comprising:
a generally rigid backing having a front side and a rear side;
a padded member having a front side, a rear side, and a peripherally-extending edge, said rear side of said padded member disposed over said front side of said generally rigid backing;
a cover having a central portion disposed over said front side of said padded member and a peripherally-extending portion disposed over a front edge portion of said peripherally-extending edge of said padded member, said padded member comprising a first coefficient of thermal expansion and said cover comprising a second coefficient of thermal expansion different from said first coefficient of thermal expansion; and
elastic means, attached to the rear side of the generally rigid backing and extending over the peripherally-extending edge of the padded member, for holding said cover tautly over said front side of said padded member to inhibit the likelihood of wrinkles appearing on said cover as said cover and said padded member expand and contract due to the change in temperature.

25. The temperature compensating outdoor wall padding apparatus of claim 24 wherein said means for holding is operable to hold said cover tautly across said front side of said padded member to inhibit the likelihood of wrinkles appearing on said cover as said cover and said padded member expand and contract over the change of temperatures between about 30-degrees Fahrenheit to about 40-degrees Fahrenheit in a few hours.

26. An outdoor wall panel system comprising:
a plurality of temperature compensating outdoor wall padding apparatus of claim 24 disposed side-by-side along a field of an outdoor stadium.

27. A method of protecting athletes in an outdoor stadium, the method comprising:
obtaining a plurality of temperature compensating outdoor wall padding apparatus of claim 24; and
installing the plurality of temperature compensating outdoor wall padding apparatus side-by-side along a field of the outdoor stadium.

28. A method for forming an outdoor wall padding apparatus which inhibits the likelihood of the appearance of wrinkles due to a change in temperature, the method comprising:
providing a generally rigid backing;
providing a padded member disposed over a front side of the backing;
providing a vinyl cover, the padded member comprising a first coefficient of thermal expansion and the cover comprising a second coefficient of thermal expansion different from the first coefficient of thermal expansion;
providing an expansion/contraction panel;
sewing a front portion of the expansion/contraction panel to a peripherally-extending portion of the cover;
positioning a central portion of the cover over a front side of the padded member and the peripherally-extending portion of the cover over a front edge portion of a peripherally-extending edge of the padded member;
pre-tensioning the expansion/contraction panel; and
attaching a rear portion of the pre-tensioned expansion/contraction panel to a rear side of the generally rigid backing to hold the cover tautly across the front side of the padded member and inhibit the likelihood of wrinkles appearing on the cover as the cover and the padded member expand and contract over a change in temperature between about 30-degrees Fahrenheit to about 40-degrees Fahrenheit in a few hours.

29. A method for forming an outdoor wall padding apparatus which inhibits the likelihood of the appearance of wrinkles due to a change in temperature, the method comprising:
providing a generally rigid backing;
providing a padded member disposed over the backing;
providing a cover, the padded member comprising a first coefficient of thermal expansion and the cover comprising a second coefficient of thermal expansion different from the first coefficient of thermal expansion;
providing at least one elastic member;
attaching a front portion of the at least one elastic member to a peripherally-extending portion of the cover;
positioning a central portion of the cover over a front side of the padded member and the peripherally-extending portion over a front edge portion of a peripherally-extending edge of the padded member;
pre-tensioning the at least one elastic member; and
attaching a rear portion of the at least pre-tensioned one elastic member to a rear side of the generally rigid backing and to the cover extending over the peripherally-extending padding to hold the cover tautly across the front side of the padded member and inhibit the likelihood of wrinkles appearing on the cover as the cover and the padded member expand and contract due to the change in temperature.

30. A temperature compensating outdoor wall padding apparatus operable to inhibit the likelihood of the appearance of wrinkles due to a change in temperature, said apparatus comprising:
a generally rigid backing having a front side and a rear side;
a padded member having a front side, a rear side, and a peripherally-extending edge defining a horizontal top edge, a horizontal bottom edge, a vertical right side edge, and a vertical left side edge, said rear side of said padded member disposed over said front side of said generally rigid backing;
a vinyl cover having a central portion disposed over said front side of said padded member and a peripherally-extending portion defining a horizontal top portion, a horizontal bottom portion, a vertical right side portion, and a vertical left side portion disposed over front edge portions of said padded member along said peripherally-extending horizontal top edge, said horizontal bottom edge, said vertical right side edge, and said vertical left side edge, respectively, of said padded member, said padded member comprising a first coefficient of thermal expansion and said cover comprising a second coefficient of thermal expansion different from said first coefficient of thermal expansion;
a expansion/contraction panel disposed over said peripherally-extending edge of said padded member and having a rear portion attached to said generally rigid backing, and a front portion having a front edge sewn to said horizontal top portion, said horizontal bottom portion, said vertical right side portion, and said vertical left side portion of said cover; and
wherein said expansion/contraction panel is pre-tensioned upon attachment to said rear side of said generally rigid backing to hold said cover tautly across said front side of said padded member and inhibit the likelihood of wrinkles appearing on said cover as said cover and said padded member expand and contract over a change in temperature between about 40-degrees Fahrenheit to about 50-degrees Fahrenheit in a few hours.

31. The temperature compensating outdoor wall padding apparatus of claim 30 wherein apparatus comprises a thickness of about 4-inches thick, a width of about 4-feet, and a height between about 2-feet and about 10 feet.

32. The temperature compensating outdoor wall padding apparatus of claim 30 wherein said expansion/contraction panel comprises a fabric material stretchable primarily in 2 directions.

33. The temperature compensating outdoor wall padding apparatus of claim 30 wherein said expansion/contraction panel comprises a fabric material stretchable in 4 directions.

34. The temperature compensating outdoor wall padding apparatus of claim 30 wherein said expansion/contraction panel comprises a greater than 50-percent stretchability and ability to return back to its original shape after being stretched.

35. The temperature compensating outdoor wall padding apparatus of claim 30 wherein said expansion/contraction panel comprises a greater than 100-percent stretchability and ability to return back to its original shape after being stretched.

36. The temperature compensating outdoor wall padding apparatus of claim 30
   wherein said cover is sewn along the entire length of said peripherally-extending portion of said cover.

37. An outdoor wall panel system comprising:
   a plurality of temperature compensating outdoor wall padding apparatus of claim 30 disposed side-by-side along a field of an outdoor stadium.

38. A method of protecting athletes in an outdoor stadium, the method comprising:
   obtaining a plurality of temperature compensating outdoor wall padding apparatus of claim 30; and
   installing the plurality of temperature compensating outdoor wall padding apparatus side-by-side along a field of the outdoor stadium.

* * * * *